United States Patent
Johnson et al.

(10) Patent No.: US 10,005,163 B2
(45) Date of Patent: Jun. 26, 2018

(54) DUST COLLECTION SYSTEM

(71) Applicants: Keith Johnson, Brooklyn Center, MN (US); Ean Johnson, Brooklyn Center, MN (US)

(72) Inventors: Keith Johnson, Brooklyn Center, MN (US); Ean Johnson, Brooklyn Center, MN (US)

( * ) Notice: Subject to any disclaimer, the term of this patent is extended or adjusted under 35 U.S.C. 154(b) by 20 days.

(21) Appl. No.: 15/233,032

(22) Filed: Aug. 10, 2016

(65) Prior Publication Data

US 2018/0043490 A1  Feb. 15, 2018

(51) Int. Cl.
| | | |
|---|---|---|
| *B23Q 11/00* | (2006.01) | |
| *A47L 7/00* | (2006.01) | |
| *B23B 45/00* | (2006.01) | |
| *B23B 51/04* | (2006.01) | |

(52) U.S. Cl.
CPC ........ *B23Q 11/0071* (2013.01); *A47L 7/0095* (2013.01); *B23B 45/003* (2013.01); *B23Q 11/0046* (2013.01); *B23B 51/0406* (2013.01); *B23B 2270/30* (2013.01); *B23B 2270/62* (2013.01)

(58) Field of Classification Search
CPC ............ B23Q 11/0046; B23Q 11/0071; B23B 2270/62; B23B 2270/30; B23B 47/34; B23C 2230/08; Y10T 409/304088; Y10T 408/50; A47L 7/0095

See application file for complete search history.

(56) References Cited

U.S. PATENT DOCUMENTS

| | | | | |
|---|---|---|---|---|
| 1,131,009 | A * | 3/1915 | Rylander | E21B 21/015 175/209 |
| 5,034,041 | A | 7/1991 | Austin | |
| 5,292,210 | A * | 3/1994 | Nowick | B23B 51/0426 408/204 |
| 5,688,082 | A * | 11/1997 | Richardson | B23Q 11/0046 408/113 |
| 6,120,220 | A * | 9/2000 | Speare | B23B 51/05 408/1 R |
| 7,396,193 | B2 | 7/2008 | Kesten | |
| D575,311 | S | 8/2008 | Konecny | |
| 7,726,417 | B2 * | 6/2010 | Larsson | E21B 21/01 175/207 |
| 2004/0011543 | A1 * | 1/2004 | Moore | B23Q 11/0046 173/198 |
| 2004/0141820 | A1 | 7/2004 | Mikon et al. | |
| 2005/0000052 | A1 | 1/2005 | Byles | |

(Continued)

FOREIGN PATENT DOCUMENTS

| | | | | |
|---|---|---|---|---|
| DE | 29819470 U1 * | 2/1999 | | B23Q 11/00 |
| EP | 0426321 | 2/1994 | | |

(Continued)

*Primary Examiner* — Ryan Rufo

(57) ABSTRACT

A dust collection system includes a drill that includes an arbor and a hole saw. A vacuum is provided that includes a hose. A bellows is provided and the bellows may be positioned against a surface. The drill is extended into the bellows to cut a hole in the surface. The bellows surrounds the hole saw to contain dust created when the hole saw cuts the hole. The hose of the vacuum is fluidly coupled to the bellows. Thus, the vacuum sucks the dust out of the bellows.

13 Claims, 5 Drawing Sheets

(56) References Cited

U.S. PATENT DOCUMENTS

| | | | |
|---|---|---|---|
| 2006/0147284 A1* | 7/2006 | Kim | B23B 49/008 408/68 |
| 2007/0065242 A1* | 3/2007 | Skradski | B23Q 11/0046 408/67 |
| 2007/0264092 A1* | 11/2007 | Kesten | B23Q 11/0046 408/67 |
| 2012/0308320 A1 | 12/2012 | Tseng | |

FOREIGN PATENT DOCUMENTS

| | | | | | |
|---|---|---|---|---|---|
| FR | 2324401 A | * | 4/1977 | | B23Q 11/0046 |
| JP | 63-200905 A | * | 9/1988 | | B23B 47/34 |
| JP | 11-165234 A | * | 6/1999 | | B23Q 11/00 |
| JP | 2000-317709 A | * | 11/2000 | | B23B 47/34 |
| JP | 2001-259960 A | * | 9/2001 | | B23Q 11/08 |
| WO | WO 9520440 A1 | * | 8/1995 | | B08B 15/04 |

* cited by examiner

DUST COLLECTION SYSTEM

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIE THE OFFICE ELECTRONIC FILING SYSTEM.

Not Applicable

STATEMENT REGARDING PRIOR DISCLOSURES BY THE INVENTOR OR JOINT INVENTOR

Not Applicable

BACKGROUND OF THE INVENTION (1) Field of the Invention.

(2) Description of Related Art including information disclosed under 37 CFR 1.97 and 1.98.

The disclosure and prior art relates to dust collection devices and more particularly pertains to a new dust collection device for collecting dust formed from cutting a hole in a surface.

BRIEF SUMMARY OF THE INVENTION

An embodiment of the disclosure meets the needs presented above by generally comprising a drill that includes an arbor and a hole saw. A vacuum is provided that includes a hose. A bellows is provided and the bellows may be positioned against a surface. The drill is extended into the bellows to cut a hole in the surface. The bellows surrounds the hole saw to contain dust created when the hole saw cuts the hole. The hose of the vacuum is fluidly coupled to the bellows. Thus, the vacuum sucks the dust out of the bellows.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
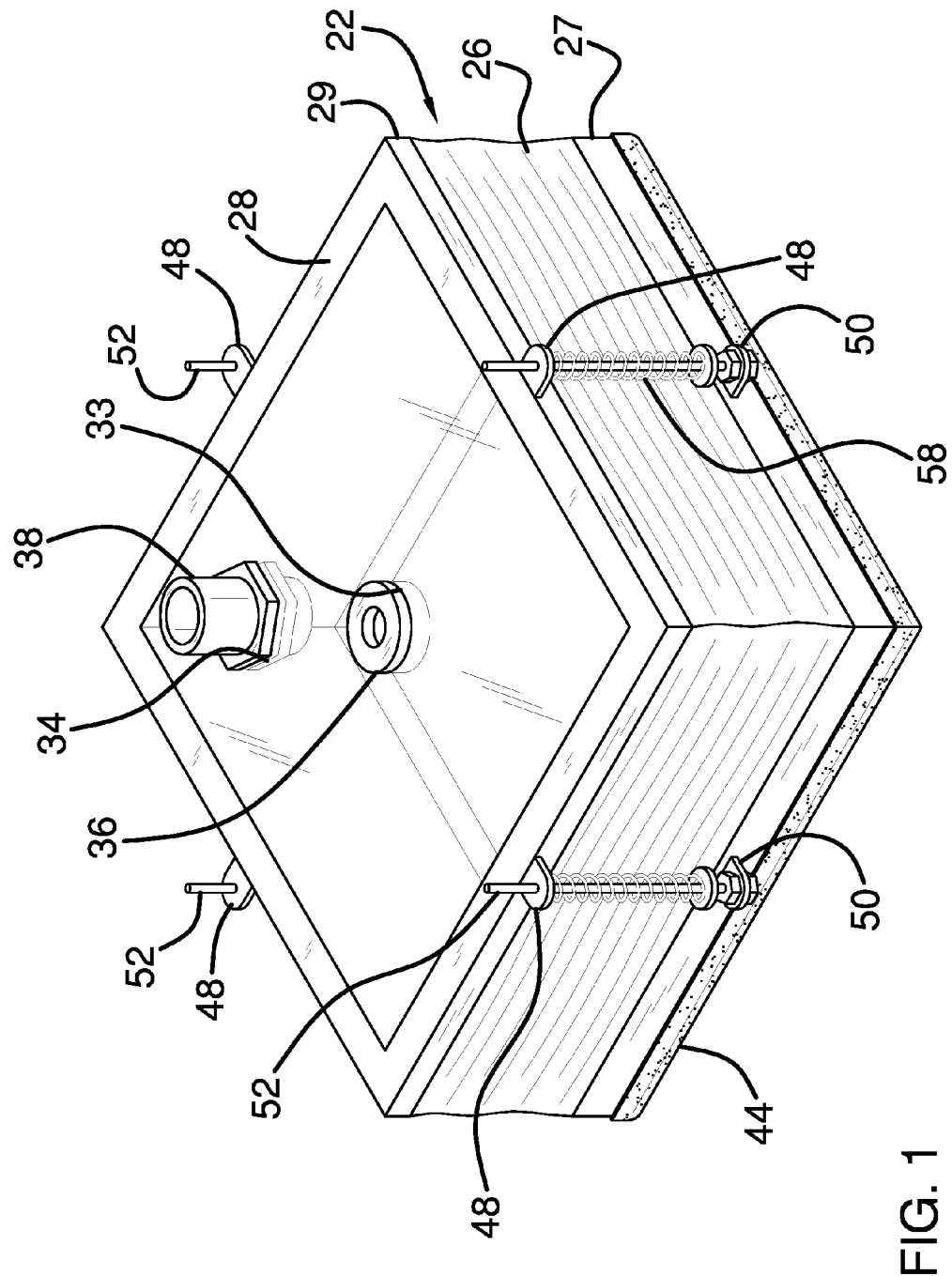
FIG. 1 is a bottom perspective view of a dust collection system according to an embodiment of the disclosure.
Figure 2:
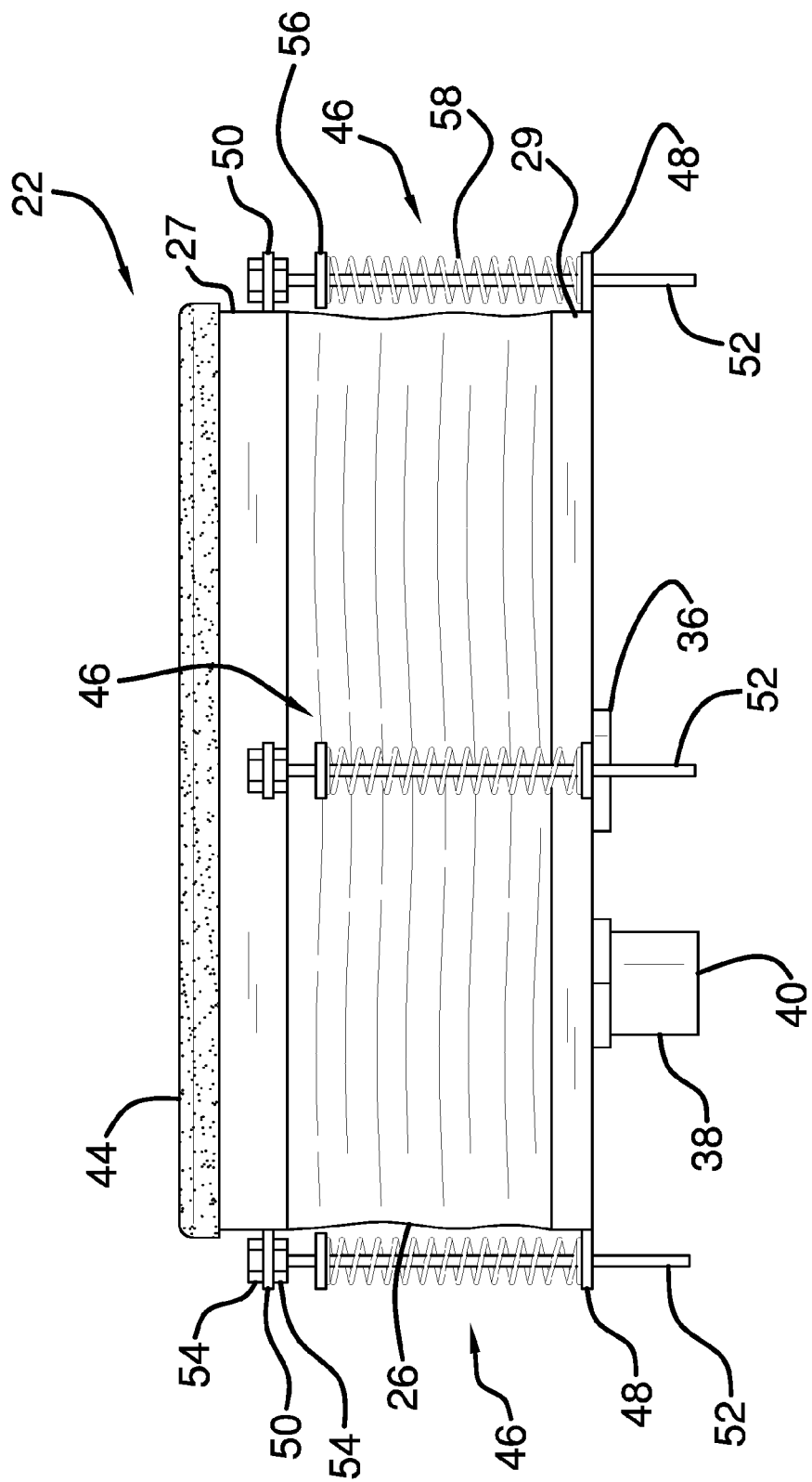
FIG. 2 is a right side view of an embodiment of the disclosure.
Figure 3:
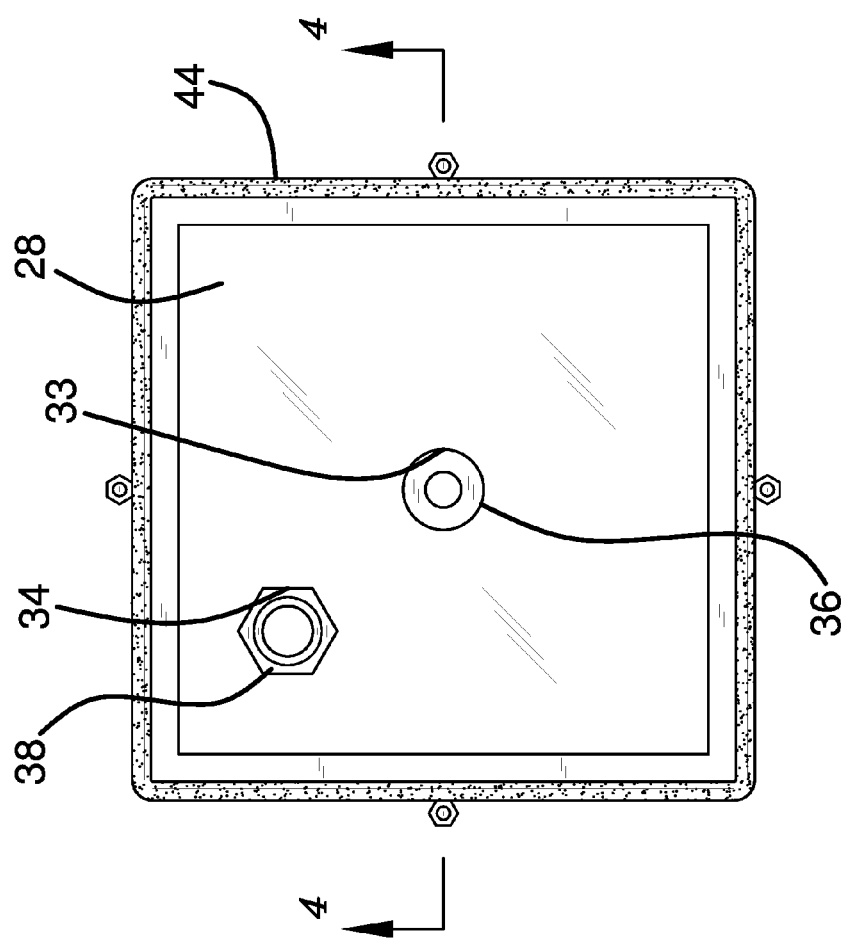
FIG. 3 is a top view of an embodiment of the disclosure.
Figure 4:
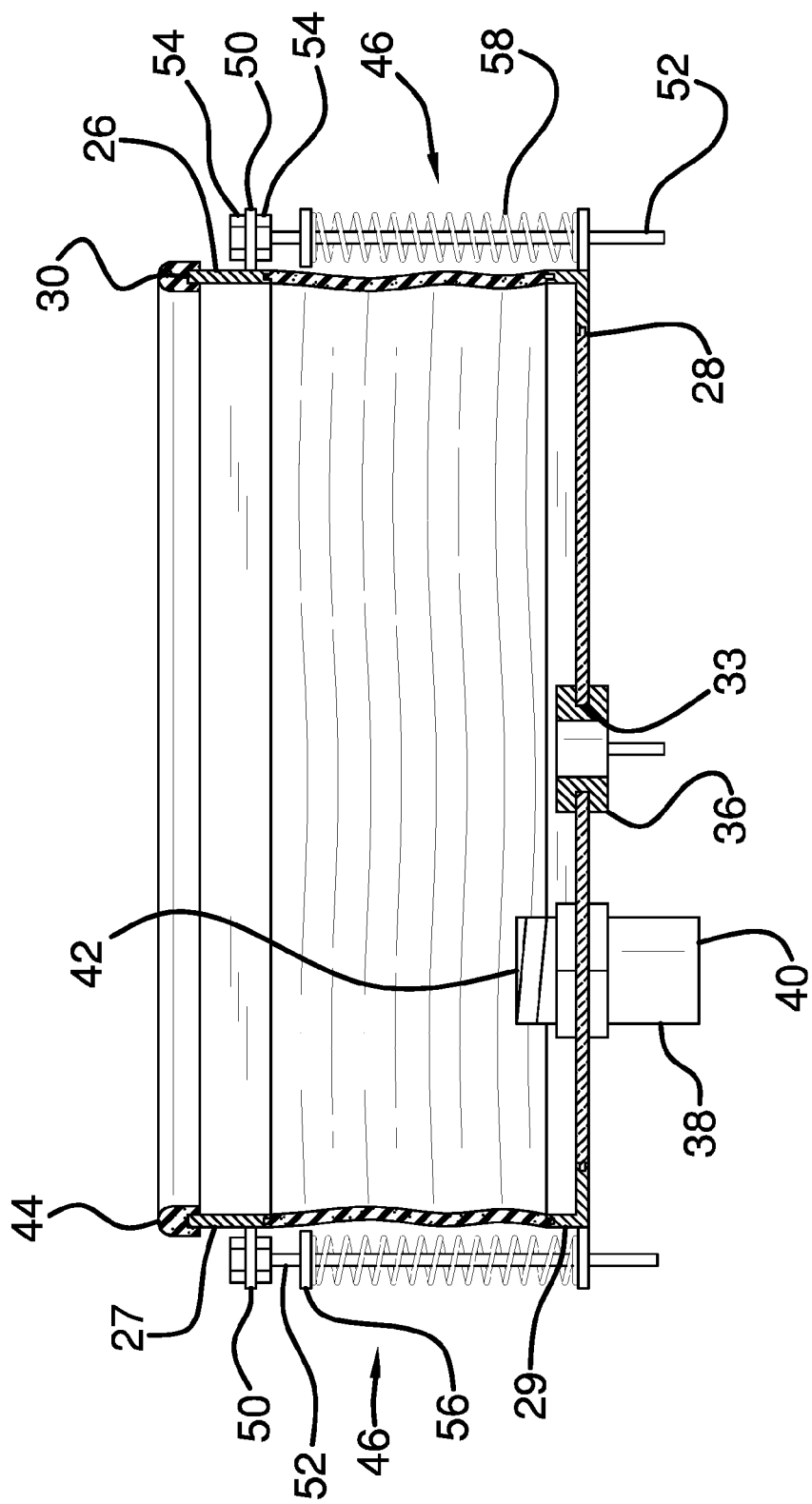
FIG. 4 is a cross sectional view taken along line 4-4 of FIG. 3 of an embodiment of the disclosure.
Figure 5:
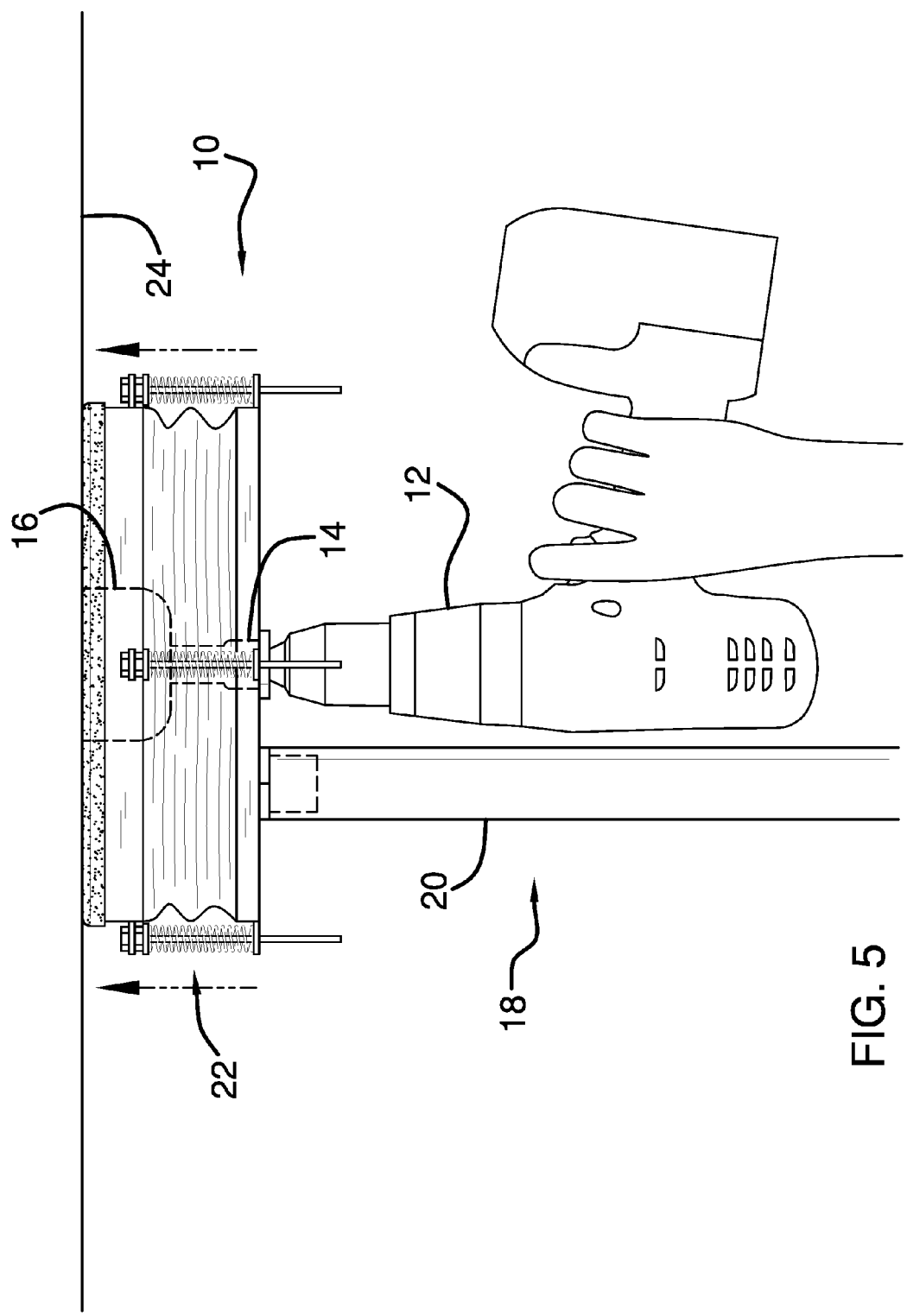
FIG. 5 is a perspective in-use view of an embodiment of the disclosure.

With reference now to the drawings, and in particular to FIGS. 1 through 5 thereof, a new dust collection device embodying the principles and concepts of an embodiment of the disclosure and generally designated by the reference numeral 10 will be described.

As best illustrated in FIGS. 1 through 5, the dust collection system 10 generally comprises a drill 12 that includes an arbor 14 and a hole saw 16. The hole saw 16 may have a diameter ranging between one inch and seven inches. The drill 12 may be a cordless drill 12 or a corded drill 12. A vacuum 18 is provided and the vacuum 18 includes a hose 20. The vacuum 18 may be an electric vacuum 18 or the like.

A bellows 22 is provided. The bellows 22 may be positioned against a surface 24. The surface 24 may be a ceiling in a building or the like. The drill 12 is extended into the bellows 22 thereby facilitating the hole saw 16 to cut a hole in the surface 24. The bellows 22 surrounds the hole saw 16 to contain dust created when the hole saw 16 cuts the hole. The hose 20 of the vacuum 18 is fluidly coupled to the bellows 22. Thus, the vacuum 18 may suck the dust out of the bellows 22.

The bellows 22 has a bottom wall 26 and an outer wall 28 extending upwardly therefrom. The outer wall 28 has a distal edge 30 with respect to the bottom wall 26 to define an opening 32 into the bellows 22. The distal edge 30 is selectively positioned to abut the surface 24. The bottom wall 26 is comprised of a translucent material. Thus, the hole saw 16 may be observed when the hole saw 16 is cutting the hole.

The outer wall 28 is substantially comprised of a deformable material. Thus, the bottom wall 26 is selectively urgeable toward the distal edge 30. The outer wall 28 has a first rigid portion 27 and a second rigid portion 29. The first rigid portion 27 is coextensive with the distal edge 30. The second rigid portion 29 is coextensive with the bottom wall 26. The bottom wall 26 has a first aperture 33 extending therethrough. The first aperture 33 is centrally positioned on the bottom wall 26. The bottom wall 26 has a second aperture 34 extending therethrough.

A bushing 36 is provided. The bushing 36 is positioned in the first aperture 32. The arbor 14 is selectively extended through the bushing 36 and the hole saw 16 is positioned within the bellows 22. The bushing 36 forms a fluid impermeable seal with the arbor 14. Thus, the bushing 36 inhibits the dust from exiting the first aperture 32.

A fitting 38 is provided that has first end 40 and a second end 42. Each of the first end 40 and the second end 42 are open and the fitting 38 is substantially hollow. The fitting 38 is positioned in the second aperture 34 and the fitting 38 forms a fluid impermeable seal with the bottom wall 26. The second end 42 is in fluid communication with an interior of the bellows 22. The hose 20 of the vacuum 18 is fluidly coupled to the first end 40. Thus, the vacuum 18 may suck the dust from the bellows 22.

A pad 44 is coupled to the distal edge 30 of the bellows 22. The pad 44 abuts the surface 24 when the bellows 22 is positioned against the surface 24. The pad 44 is comprised of a resiliently compressible material. Thus, the pad 44 inhibits the dust from passing between the distal edge 30 and the surface 24. The pad 44 is coextensive with the distal edge 30.

A plurality of compressors 46 is provided. Each of the compressors 46 is coupled to the outer wall 28 of the bellows 22. Each of the compressors 46 selectively compresses the bottom wall 26 of the bellows 22 toward the distal edge 30 of the bellows 22. Each of the compressors 46 comprises a first tab 48 that is coupled to and extends outwardly from the outer wall 28. The first tab 48 is aligned with the bottom wall 26.

A second tab 50 is coupled to and extends outwardly from the outer wall 28. The second tab 50 is spaced from the first tab 48. The second tab 50 is aligned with the first tab 48. A rod 52 slidably extends through each of the first tab 48 and the second tab 50.

A pair of nuts 54 is provided. Each of the nuts 54 is coupled to the rod 52. Each of the nuts 54 engages opposite sides of the second tab 50. Thus, the rod 52 is immovably fastened to the second tab 50.

A washer 56 is provided and the washer 56 is coupled around the rod 52. The washer 56 is spaced from the nuts 54. A biasing member 58 is positioned around the rod 52. The biasing member 58 extends between the first tab 48 and the washer 56. The biasing member 58 biases the washer 56 away from the first tab 48.

In use, the hole saw 16 is positioned in the bellows 22 such that the arbor 14 extends outwardly through the bushing 36. The arbor 14 is coupled to the drill 12. The hose 20 of the vacuum 18 is fluidly coupled to the fitting 38. The bellows 22 is manipulated such that the pad 44 abuts the surface 24.

The drill 12 is manipulated such that the hole saw 16 engages the surface 24. Thus, the hole saw 16 cuts a hole in the surface 24. The bellows 22 contains the dust resulting from the hole cut in the surface 24. The vacuum 18 sucks the dust out of the bellows 22. Thus, the dust is inhibited from contaminating the immediate environment with respect to the bellows 22. The bellows 22 enhances cleanliness when cutting a hole in the surface 24.

With respect to the above description then, it is to be realized that the optimum dimensional relationships for the parts of an embodiment enabled by the disclosure, to include variations in size, materials, shape, form, function and manner of operation, system and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

We claim:

1. A dust collection system combining a vacuum and a drill, said system comprising:
   a drill including an arbor and a hole saw;
   a vacuum including a hose;
   a bellows being configured to be positioned against a surface, said drill being extended into said bellows wherein said hole saw is configured to cut a hole in the surface, said bellows surrounding said hole saw wherein said bellows is configured to contain dust created when said hole saw cuts the hole, said hose of said vacuum being fluidly coupled to said bellows wherein said vacuum is configured to suck the dust out of said bellows, said bellows having a bottom wall and an outer wall extending upwardly therefrom, said outer wall having a distal edge with respect to said bottom wall to define an opening into said bellows, said bottom wall being comprised of a translucent material, said outer wall being comprised of a deformable material such that said bottom wall is urgeable toward said distal edge; and
   a plurality of compressors, each of said compressors having opposite ends being coupled to said outer wall of said bellows at a rigid portion, each of said compressors is compressible such that said bottom wall of said bellows is capable of being compressed toward said distal edge of said bellows.

2. The system according to claim 1, wherein said bottom wall having a first aperture extending therethrough, said first aperture being centrally positioned on said bottom wall.

3. The system according to claim 1, wherein said bottom wall has a second aperture extending therethrough.

4. The system according to claim 2, further comprising a bushing being positioned in said first aperture, said arbor being extended through said bushing having said hole saw being positioned within said bellows, said bushing forming a fluid impermeable seal with said arbor wherein said bushing is configured to inhibit the dust from exiting said first aperture.

5. The system according to claim 3, further comprising a fitting having first end and a second end, each of said first end and said second end being open, said fitting being substantially hollow, said fitting being positioned in said second aperture such that said fitting forms a fluid impermeable seal with said bottom wall, said second end being in fluid communication with an interior of said bellows, said hose of said vacuum being fluidly coupled to said first end thereby facilitating said vacuum to suck the dust from said bellows.

6. The system according to claim 1, further comprising a pad being coupled to said distal edge of said bellows wherein said pad is configured to abut the surface, said pad being comprised of a resiliently compressible material wherein said pad is configured to inhibit the dust from passing between said distal edge and the surface.

7. The system according to claim 1, wherein a first end of said opposite ends of each of said compressors comprises a first tab being coupled to and extending outwardly from said outer wall, said first tab being aligned with said bottom wall.

8. The system according to claim 7, wherein a second end of said opposite ends of each of said compressors comprises a second tab being coupled to and extending outwardly from said outer wall, said second tab being spaced from said first tab, said second tab being aligned with said first tab.

9. The system according to claim 8, further comprising a rod slidably extending through each of said first tab and said second tab.

10. The system according to claim 9, further comprising a pair of nuts, each of said nuts being coupled to said rod, each of said nuts engaging opposite sides of said second tab such that said rod is immovably fastened to said second tab.

11. The system according to claim 10, further comprising a washer being coupled around said rod, said washer being spaced from said nuts.

12. The system according to claim 11, further comprising a biasing member being positioned around said rod, said biasing member extending between said first tab and said washer, said biasing member biasing said washer away from said first tab.

13. A dust collection system combining a vacuum and a drill, said system comprising:
- a drill including an arbor and a hole saw;
- a vacuum including a hose;
- a bellows being configured to be positioned against a surface, said drill being extended into said bellows wherein said hole saw is configured to cut a hole in the surface, said bellows surrounding said hole saw wherein said bellows is configured to contain dust created when said hole saw cuts the hole, said hose of said vacuum being fluidly coupled to said bellows wherein said vacuum is configured to suck the dust out of said bellow, said bellows having a bottom wall and an outer wall extending upwardly therefrom, said outer wall having a distal edge with respect to said bottom wall to define an opening into said bellows, said bottom wall being comprised of a translucent material, said outer wall being comprised of a deformable material such that said bottom wall is urgeable toward said distal edge, said bottom wall having a first aperture extending therethrough, said first aperture being centrally positioned on said bottom wall, said bottom wall having a second aperture extending therethrough;
- a bushing being positioned in said first aperture, said arbor being extended through said bushing having said hole saw being positioned within said bellows, said bushing forming a fluid impermeable seal with said arbor wherein said bushing is configured to inhibit the dust from exiting said first aperture;
- a fitting having first end and a second end, each of said first end and said second end being open, said fitting being substantially hollow, said fitting being positioned in said second aperture such that said fitting forms a fluid impermeable seal with said bottom wall, said second end being in fluid communication with an interior of said bellows, said hose of said vacuum being fluidly coupled to said first end thereby facilitating said vacuum to suck the dust from said bellows;
- a pad being coupled to said distal edge of said bellows wherein said pad is configured to abut the surface, said pad being comprised of a resiliently compressible material wherein said pad is configured to inhibit the dust from passing between said distal edge and the surface; and
- a plurality of compressors, each of said compressors having opposite ends being coupled to said outer wall of said bellows at a rigid portion, each of said compressors is compressible such that said bottom wall of said bellows is capable of being compressed toward said distal edge of said bellows, each of said compressors comprising:
  - a first end of said opposite ends comprising a first tab being coupled to and extending outwardly from said outer wall, said first tab being aligned with said bottom wall,
  - a second end of said opposite ends comprising a second tab being coupled to and extending outwardly from said outer wall, said second tab being spaced from said first tab, said second tab being aligned with said first tab,
  - a rod slidably extending through each of said first tab and said second tab,
  - a pair of nuts, each of said nuts being coupled to said rod, each of said nuts engaging opposite sides of said second tab such that said rod is immovably fastened to said second tab,
  - a washer being coupled around said rod, said washer being spaced from said nuts, and
  - a biasing member being positioned around said rod, said biasing member extending between said first tab and said washer, said biasing member biasing said washer away from said first tab.

\* \* \* \* \*